US010055823B2

(12) United States Patent
Chang et al.

(10) Patent No.: US 10,055,823 B2
(45) Date of Patent: Aug. 21, 2018

(54) METHOD FOR GENERATING A PIXEL FILTERING BOUNDARY FOR USE IN AUTO WHITE BALANCE CALIBRATION

(71) Applicant: Realtek Semiconductor Corp., Hsinchu (TW)

(72) Inventors: Wei-Te Chang, Taoyuan (TW); Shih-Tse Chen, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 17 days.

(21) Appl. No.: 15/291,691

(22) Filed: Oct. 12, 2016

(65) Prior Publication Data

US 2017/0206641 A1    Jul. 20, 2017

(30) Foreign Application Priority Data

Jan. 14, 2016 (TW) ............... 105101143 A

(51) Int. Cl.
*G06K 9/00* (2006.01)
*G09G 5/02* (2006.01)
(Continued)

(52) U.S. Cl.
CPC ............... *G06T 5/005* (2013.01); *G01J 3/50* (2013.01); *G06T 5/007* (2013.01); *H04N 1/6077* (2013.01);
(Continued)

(58) Field of Classification Search
USPC ............... 382/167; 348/223.1, 557; 345/591; 358/516
See application file for complete search history.

(56) References Cited

U.S. PATENT DOCUMENTS 5,317,648 A * 5/1994 Sawada ............... G01J 3/46
348/664
7,589,739 B2 * 9/2009 Hasegawa ............ H04N 17/04
345/581
(Continued)

FOREIGN PATENT DOCUMENTS

CN    101529889 A    9/2009
CN    102388615 A    3/2012

*Primary Examiner* — Kathleen Y Dulaney
(74) *Attorney, Agent, or Firm* — Birch, Stewart, Kolasch & Birch, LLP

(57) ABSTRACT

A method for generating a pixel filtering boundary required by the auto white balance (AWB) calibration is proposed. The method includes: taking a specific color temperature reference point as a center and dividing a G/B-G/R color space into six color regions having different color component relationships; based on a saturation calculating approach of a HSV color space, respectively identifying six color boundaries in the six color regions to generate a specific hexagonal filtering boundary, so that each color boundary has a predetermined saturation difference with the specific color temperature reference point; adopting the approach for generating the specific hexagonal filtering boundary to respectively identify multiple hexagonal filtering boundaries corresponding to other color temperature reference points; generating an enveloping boundary as a pixel filtering boundary based on the specific hexagonal filtering boundary and the multiple hexagonal filtering boundaries.

4 Claims, 6 Drawing Sheets

(51) Int. Cl.
  *H04N 1/46*   (2006.01)
  *H04N 9/73*   (2006.01)
  *H04N 5/46*   (2006.01)
  *G06T 5/00*   (2006.01)
  *H04N 1/60*   (2006.01)
  *G01J 3/50*   (2006.01)
  *H04N 17/02*   (2006.01)

(52) U.S. Cl.
  CPC ............... *H04N 9/73* (2013.01); *H04N 17/02* (2013.01); *G06T 2207/10024* (2013.01)

(56) References Cited

U.S. PATENT DOCUMENTS

| | | | |
|---|---|---|---|
| 2005/0219379 A1* | 10/2005 | Shi | H04N 1/6086 348/223.1 |
| 2008/0101690 A1* | 5/2008 | Hsu | H04N 1/6027 382/162 |
| 2010/0259639 A1 | 10/2010 | Hung et al. | |
| 2014/0168463 A1* | 6/2014 | Tamura | H04N 9/735 348/223.1 |
| 2014/0198102 A1* | 7/2014 | Kim | G06T 15/08 345/419 |

* cited by examiner

METHOD FOR GENERATING A PIXEL FILTERING BOUNDARY FOR USE IN AUTO WHITE BALANCE CALIBRATION

CROSS-REFERENCE TO RELATED APPLICATIONS

This application claims the benefit of priority to Patent Application No. 105101143, filed in Taiwan on Jan. 14, 2016; the entirety of which is incorporated herein by reference for all purposes.

BACKGROUND

The disclosure generally relates to the auto white balance (AWB) calibration and, more particularly, to a method for generating a pixel filtering boundary required by the AWB calibration.

The AWB calibration greatly affects the image quality, and is thus widely employed in many applications, such as digital cameras, smart phones, tablet computers, surveillance systems, or the like.

The pixel data is typically represented in the form of RGB format in general imaging system, but the conventional AWB calibration has to convert the pixel data to the Cb-Cr color space so that the pixel data can be filtered and compensated during the AWB calibration. Afterwards, compensated pixel data would be converted from the G/B-G/R color space to the R gain and B gain to be applied in the imaging system.

In other words, the conventional AWB calibration needs to convert the pixel data between the G/B-G/R color space and the Cb-Cr color space. Converting pixel data between the G/B-G/R color space and Cb-Cr color space not only requires extra computations, but also easily causes color error in the resulting image.

SUMMARY

An example embodiment of a method for generating a pixel filtering boundary required by an auto white balance calibration is disclosed. The method comprises: dividing a G/B-G/R color space into six color regions having different color component relationships with referring a specific color temperature reference point as a center; respectively identifying six color boundaries in the six color regions by adopting a saturation calculating approach of a HSV color space to generate a specific hexagonal filtering boundary corresponding to the specific color temperature reference point, so that each of the six color boundaries has a predetermined saturation difference with the specific color temperature reference point; respectively identifying multiple hexagonal filtering boundaries corresponding to other color temperature reference points by adopting same approach utilized for generating the specific hexagonal filtering boundary; generating an enveloping boundary in the G/B-G/R color space based on the specific hexagonal filtering boundary and the multiple hexagonal filtering boundaries; and configuring the enveloping boundary as a pixel filtering boundary to be used in the auto white balance calibration.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
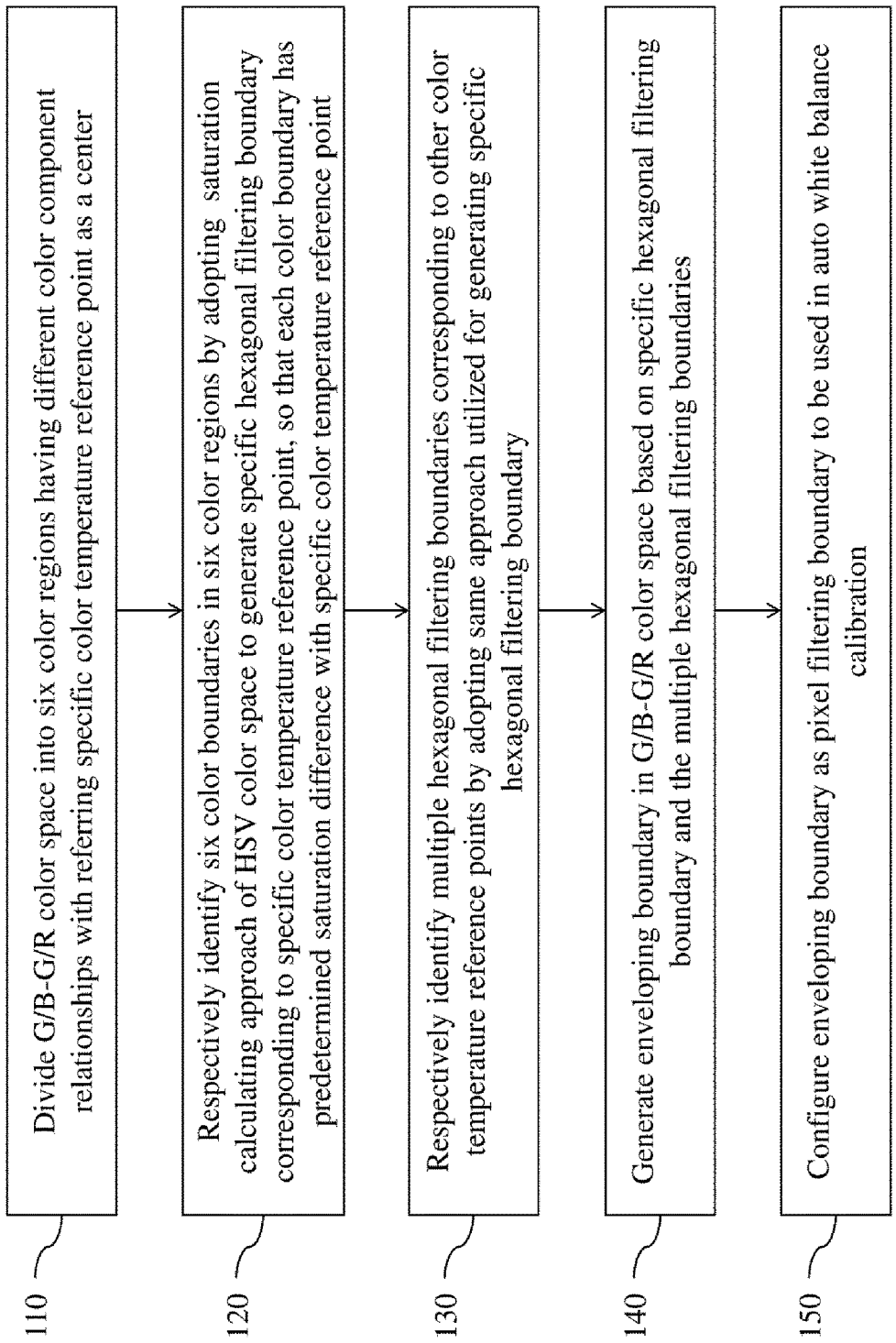
FIG. 1 shows a simplified flowchart of a method for generating a pixel filtering boundary for use in the AWB calibration according to one embodiment of the present disclosure.

FIG. 1 shows a simplified flowchart of a method for generating a pixel filtering boundary for use in the AWB calibration according to one embodiment of the present disclosure. In practical applications, an imaging system, such as a digital camera, a smart phone, a tablet computer, or a surveillance system, is enabled to generate a pixel filtering boundary for use in subsequent AWB calibration by executing software implementing the method of FIG. 1. Then, the imaging system may utilize the resulting pixel filtering boundary to filter pixel data in images to accordingly conduct the AWB calibration.

The imaging system may select multiple color temperature reference points by adopting various known approaches or based on the user's configuration. Then, the imaging system may utilize the selected color temperature reference points as a reference basis for conducting the subsequent AWB calibration. For example, FIG. 2 shows a simplified schematic diagram of multiple color temperature reference points 210~260 in the G/B-G/R color space according to one embodiment of the present disclosure.

In the operation 110, the imaging system may refer a specific color temperature reference point in the G/B-G/R color space as a center, and divide the G/B-G/R color space into six color regions having different color component relationships.

Figure 2:
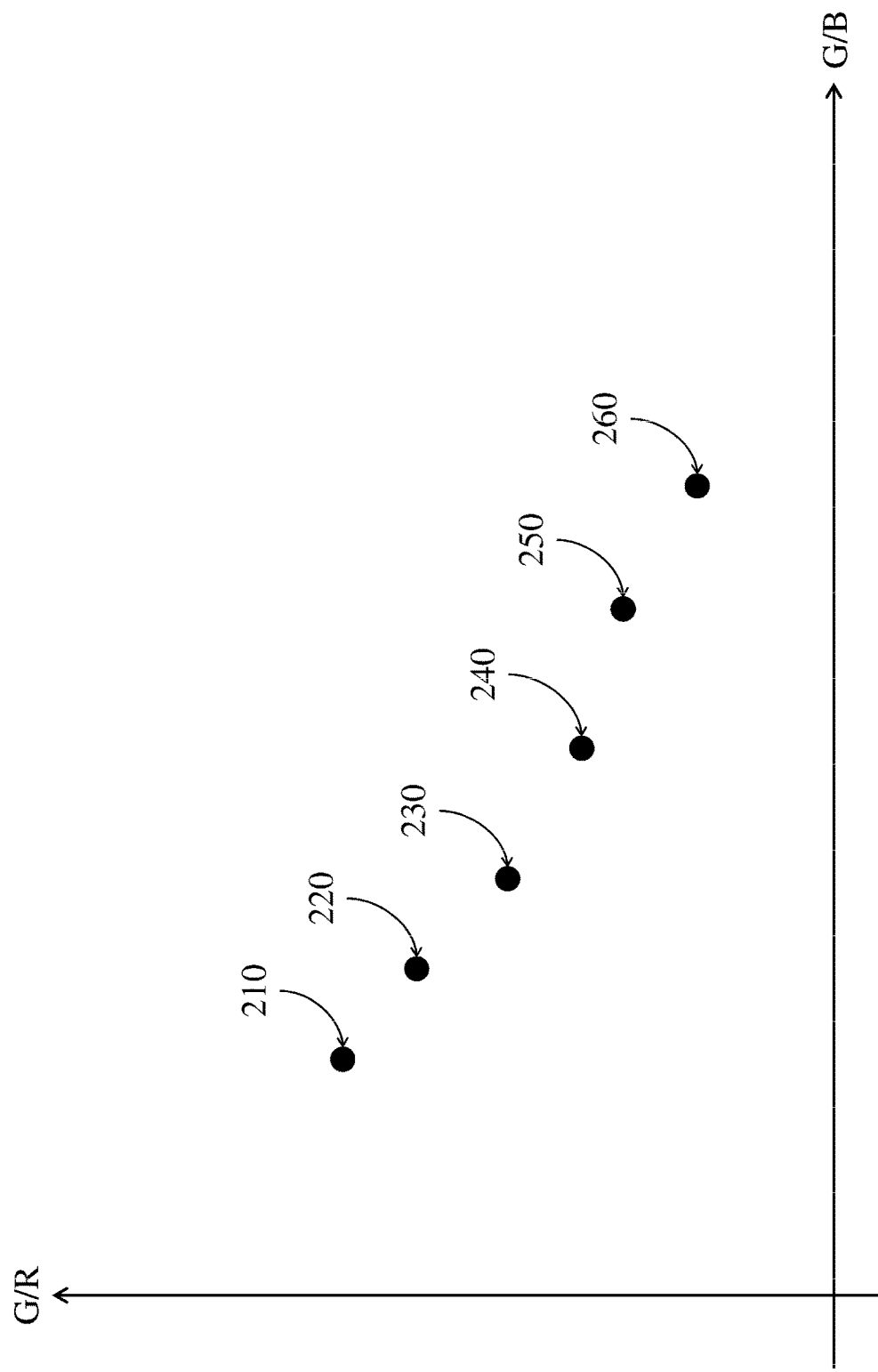
FIG. 2 shows a simplified schematic diagram of multiple color temperature reference points in the G/B-G/R color space according to one embodiment of the present disclosure.
Figure 3:
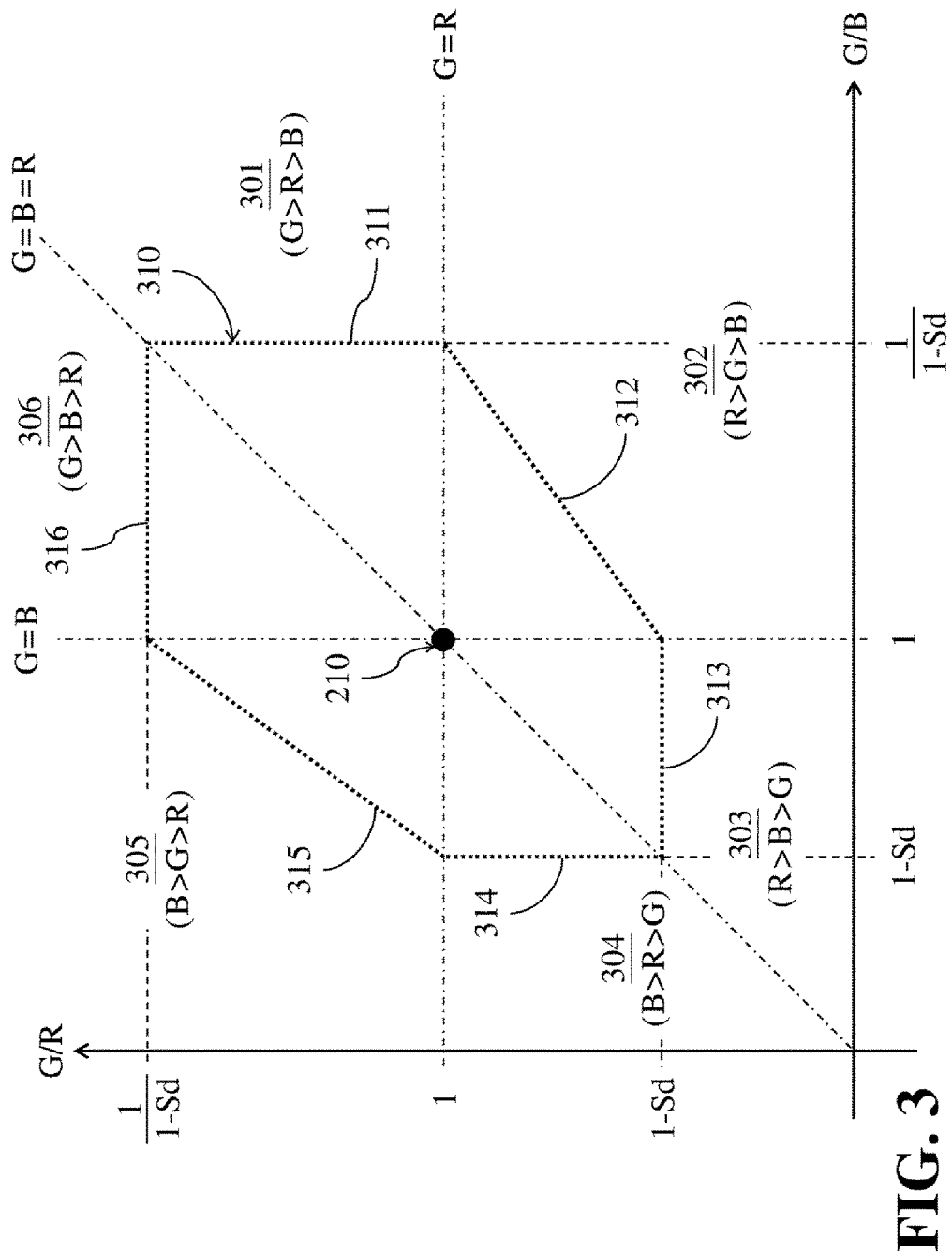
FIG. 3 shows a simplified schematic diagram of a hexagonal filtering boundary corresponding to a specific color temperature reference point in the G/B-G/R color space according to one embodiment of the present disclosure.

For illustrative purpose, it is assumed hereafter that the color temperature reference point 210 in FIG. 2 is taken as an example of the aforementioned specific color temperature reference point. As shown in FIG. 3, the imaging system may divide the G/B-G/R color space into six color regions 301~306 having different color component relationships with referring the specific color temperature reference point 210 as a center.

In the embodiment of FIG. 3, the color component relationship in the color region 301 is G>R>B, wherein R, G, and B respectively represent the values of the red color component, green color component, and blue color component. The color component relationship in the color region 302 is R>G>B. The color component relationship in the color region 303 is R>B>G. The color component relationship in the color region 304 is B>R>G. The color component relationship in the color region 305 is B>G>R. The color component relationship in the color region 306 is G>B>R.

Then, the imaging system may perform the operation 120 to respectively identify six color boundaries 311~316 in the six color regions 301~306 by adopting a saturation calculating approach of the HSV (hue, saturation, value) color space to generate a specific hexagonal filtering boundary 310 corresponding to the specific color temperature reference point 210, so that each of the six color boundaries 311~316 has a predetermined saturation difference Sd with the specific color temperature reference point 210.

Specifically, the saturation (S) in the HSV color space could be calculated as below:

$$S=[\text{Max}(R,G,B)-\text{Min}(R,G,B)]/\text{Max}(R,G,B)$$

According to the above saturation calculating approach of the HSV color space, it can be calculated that the saturation of the specific color temperature reference point 210 is zero (0).

As described previously, the color component relationship in the color region 301 is G>R>B. Accordingly, the saturation of each point in the color region 301 can be represented as $(G-B)/G$. Since the saturation of the specific color temperature reference point 210 is zero, the saturation difference between each point in the color region 301 and the specific color temperature reference point 210 can be represented as $(G-B)/G$.

Therefore, in the color region 301, the location of the pixel data whose saturation difference with the specific color temperature reference point 210 is less than the predetermined difference value Sd would satisfy the formula as below:

$$(G-B)/G < Sd \quad (1)$$

The formula (1) could be reformed as below:

$$G/B < 1/(1-Sd) \quad (2)$$

The formula (2) defines a first color boundary 311 in the color region 301. The saturation difference between the specific color temperature reference point 210 and each point in the left side of the first color boundary 311 is less than the predetermined difference value Sd, while the saturation difference between the specific color temperature reference point 210 and each point on the first color boundary 311 is equal to the predetermined difference value Sd.

Similarly, since the color component relationship in the color region 302 is R>G>B, the saturation difference between each point in the color region 302 and the specific color temperature reference point 210 can be represented as $(R-B)/R$.

Therefore, in the color region 302, the location of the pixel data whose saturation difference with the specific color temperature reference point 210 is less than the predetermined difference value Sd would satisfy the formula as below:

$$(R-B)/R < Sd \quad (3)$$

The formula (3) could be reformed as below:

$$(G/R)/(G/B) < 1-Sd \quad (4)$$

The formula (4) defines a second color boundary 312 in the color region 302. The saturation difference between the specific color temperature reference point 210 and each point in the upper-left side of the second color boundary 312 is less than the predetermined difference value Sd, while the saturation difference between the specific color temperature reference point 210 and each point on the second color boundary 312 is equal to the predetermined difference value Sd.

Similarly, since the color component relationship in the color region 303 is R>B>G, the saturation difference between each point in the color region 303 and the specific color temperature reference point 210 can be represented as $(R-G)/R$.

Therefore, in the color region 303, the location of the pixel data whose saturation difference with the specific color temperature reference point 210 is less than the predetermined difference value Sd would satisfy the formula as below:

$$(R-G)/R < Sd \quad (5)$$

The formula (5) could be reformed as below:

$$G/R > 1-Sd \quad (6)$$

The formula (6) defines a third color boundary 313 in the color region 303. The saturation difference between the specific color temperature reference point 210 and each point in the upper side of the third color boundary 313 is less than the predetermined difference value Sd, while the saturation difference between the specific color temperature reference point 210 and each point on the third color boundary 313 is equal to the predetermined difference value Sd.

Similarly, since the color component relationship in the color region 304 is B>R>G, the saturation difference between each point in the color region 304 and the specific color temperature reference point 210 can be represented as $(B-G)/B$.

Therefore, in the color region 304, the location of the pixel data whose saturation difference with the specific color temperature reference point 210 is less than the predetermined difference value Sd would satisfy the formula as below:

$$(B-G)/B < Sd \quad (7)$$

The formula (7) could be reformed as below:

$$G/B > 1-Sd \quad (8)$$

The formula (8) defines a fourth color boundary 314 in the color region 304. The saturation difference between the specific color temperature reference point 210 and each point in the right side of the fourth color boundary 314 is less than the predetermined difference value Sd, while the saturation difference between the specific color temperature reference point 210 and each point on the fourth color boundary 314 is equal to the predetermined difference value Sd.

Similarly, since the color component relationship in the color region 305 is B>G>R, the saturation difference between each point in the color region 305 and the specific color temperature reference point 210 can be represented as $(B-R)/B$.

Therefore, in the color region 305, the location of the pixel data whose saturation difference with the specific color temperature reference point 210 is less than the predetermined difference value Sd would satisfy the formula as below:

$$(B-R)/B < Sd \quad (9)$$

The formula (9) could be reformed as below:

$$(G/R)/(G/B) < 1/(1-Sd) \quad (10)$$

The formula (10) defines a fifth color boundary 315 in the color region 305. The saturation difference between the specific color temperature reference point 210 and each point in the lower-right side of the fifth color boundary 315 is less than the predetermined difference value Sd, while the saturation difference between the specific color temperature reference point 210 and each point on the fifth color boundary 315 is equal to the predetermined difference value Sd.

Similarly, since the color component relationship in the color region 306 is G>B>R, the saturation difference between each point in the color region 306 and the specific color temperature reference point 210 can be represented as (G−R)/G.

Therefore, in the color region 306, the location of the pixel data whose saturation difference with the specific color temperature reference point 210 is less than the predetermined difference value Sd would satisfy the formula as below:

$$(G-R)/G < Sd \quad (11)$$

The formula (11) could be reformed as below:

$$G/R < 1/(1-Sd) \quad (12)$$

The formula (12) defines a sixth color boundary 316 in the color region 306. The saturation difference between the specific color temperature reference point 210 and each point in the lower side of the sixth color boundary 316 is less than the predetermined difference value Sd, while the saturation difference between the specific color temperature reference point 210 and each point on the sixth color boundary 316 is equal to the predetermined difference value Sd.

The imaging system may connect the aforementioned six color boundaries 311~316 to form the specific hexagonal filtering boundary 310 corresponding to the specific color temperature reference point 210. It can be appreciated from the foregoing descriptions that the saturation difference between the specific color temperature reference point 210 and each position on the specific hexagonal filtering boundary 310 is the predetermined difference value Sd. When a specific pixel data is located within the specific hexagonal filtering boundary 310, it means that the saturation difference between the specific pixel data and the specific color temperature reference point 210 is less than the predetermined difference value Sd.

It can be appreciated from the previous descriptions and FIG. 3, the aforementioned six color boundaries 311~316 are connected in order, wherein the first color boundary 311 is parallel with the fourth color boundary 314, the third color boundary 313 is parallel with the sixth color boundary 316, the first color boundary 311 is perpendicular to the sixth color boundary 316, while the third color boundary 313 is perpendicular to the fourth color boundary 314.

It is also clearly shown in FIG. 3 that the first color boundary 311 and the fourth color boundary 314 are both perpendicular to the G/B axis of the G/B-G/R color space, while the third color boundary 313 and the sixth color boundary 316 are both perpendicular to the G/R axis of the G/B-G/R color space.

Figure 4:
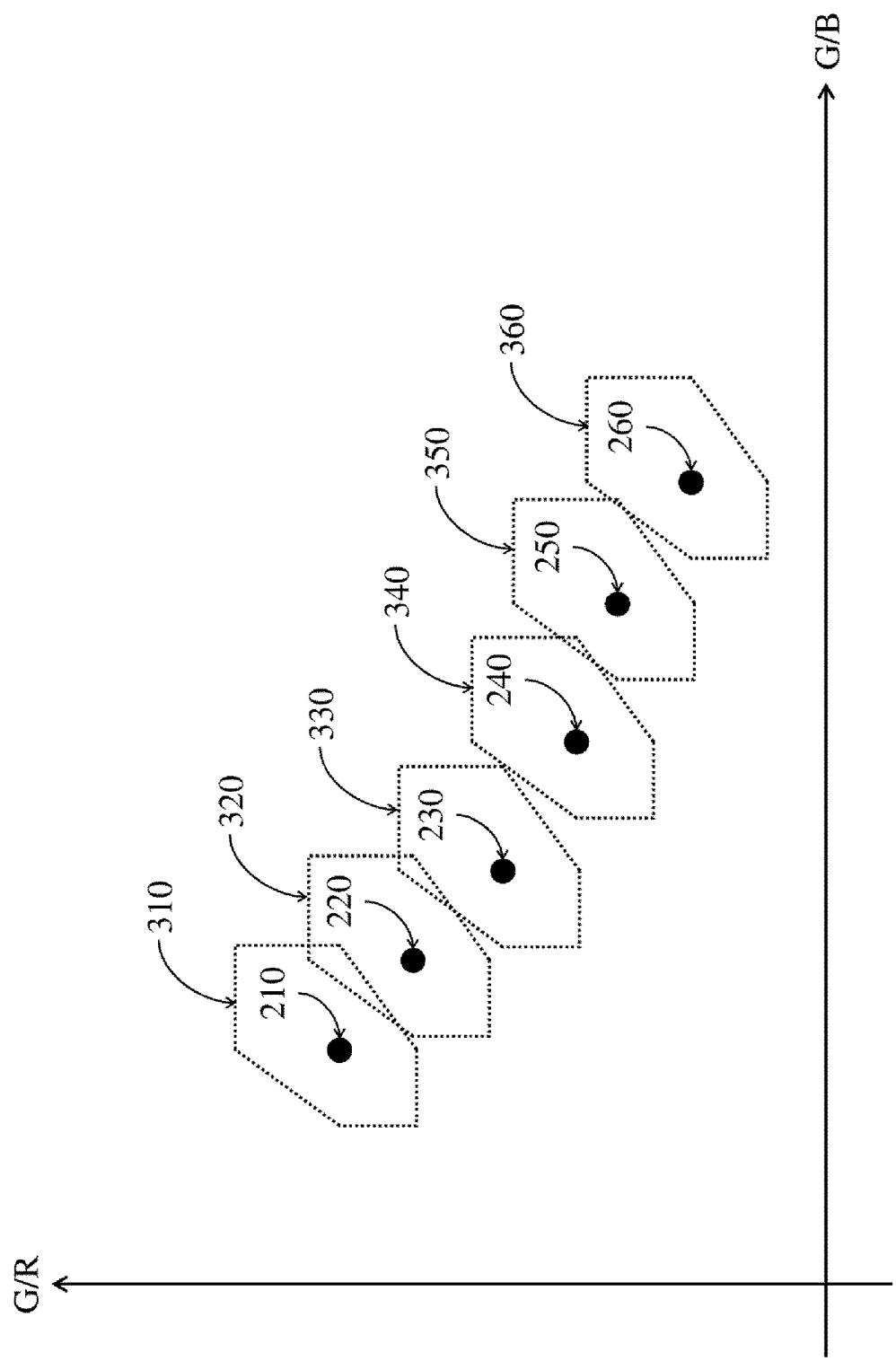
FIG. 4 shows a simplified schematic diagram of multiple hexagonal filtering boundaries corresponding to the multiple color temperature reference points in FIG. 2 according to one embodiment of the present disclosure.

Then, as shown in FIG. 4, the imaging system may perform the operation 130 to respectively identify multiple hexagonal filtering boundaries 320~360 corresponding to other color temperature reference points 220~260 by adopting same approach utilized for generating the specific hexagonal filtering boundary 310.

Figure 5:
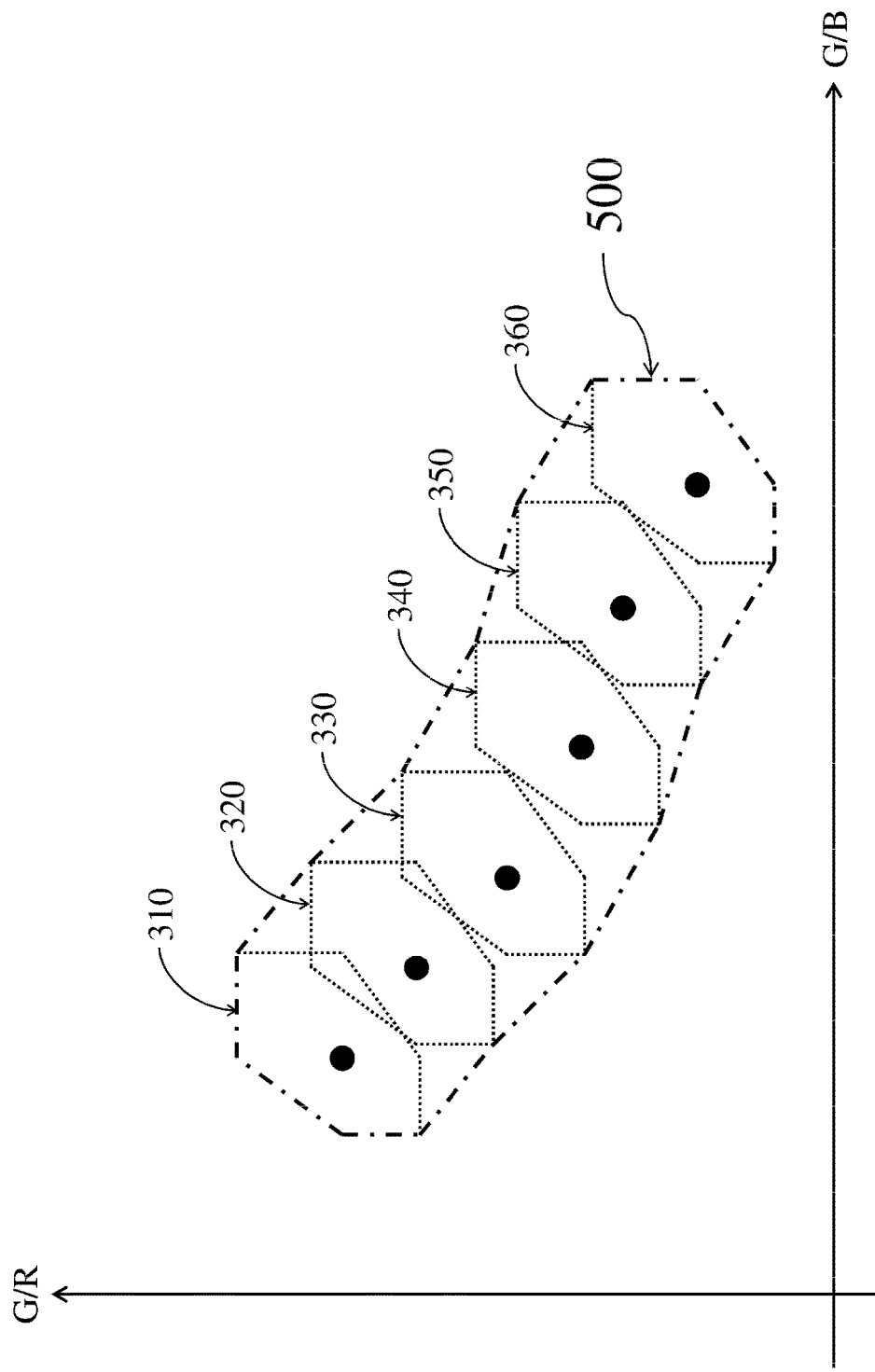
FIG. 5 shows a simplified schematic diagram of a pixel filtering boundary defined by the multiple hexagonal filtering boundaries in FIG. 4 according to one embodiment of the present disclosure.

In the operation 140, the imaging system may generate an enveloping boundary in the G/B-G/R color space as shown in FIG. 5 based on the specific hexagonal filtering boundary 310 generated in the operation 120 and the multiple hexagonal filtering boundaries 320~360 generated in the operation 130.

In the operation 150, the imaging system may configure the enveloping boundary corresponding to the hexagonal filtering boundaries 310~360 as a pixel filtering boundary 500 to be used in the subsequent AWB calibration.

Afterwards, before the imaging system performs the AWB calibration on the image data, the imaging system may utilize the pixel filtering boundary 500 to filter the pixel data in the image data, so as to filter out erroneous pixel data that may adversely affect the accuracy of the AWB calibration.

Figure 6:
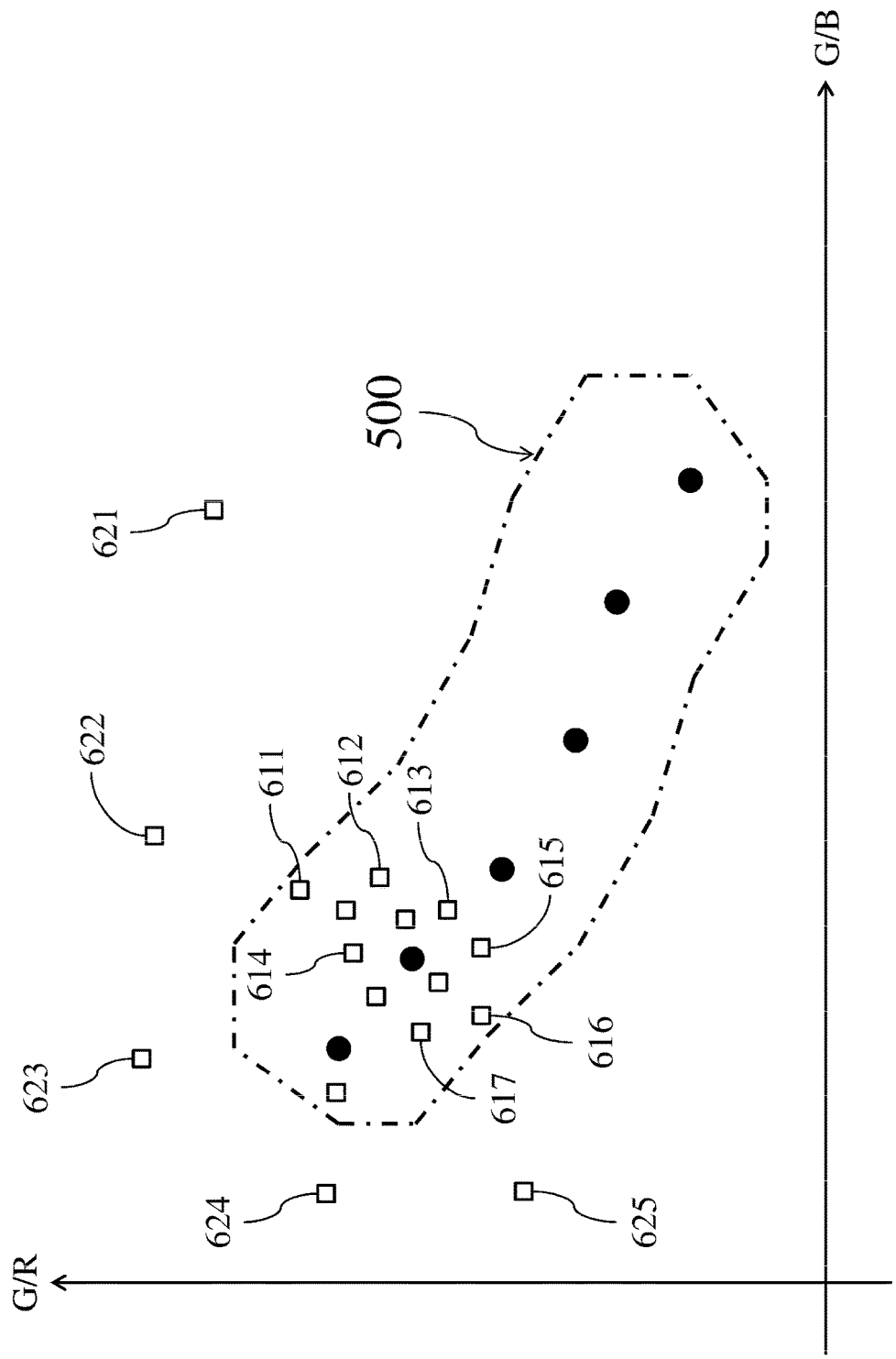
FIG. 6 shows a simplified schematic diagram of filtering pixel data based on the pixel filtering boundary in FIG. 5 according to one embodiment of the present disclosure.

For example, FIG. 6 shows a simplified schematic diagram of filtering pixel data based on the pixel filtering boundary 500 in FIG. 5 according to one embodiment of the present disclosure. In FIG. 6, reference numbers 611~617 and 621-625 denote the pixel data in the RGB format image data received by the imaging system.

Since the pixel data 621~625 located outside the pixel filtering boundary 500 may likely cause error in the AWB calibration, the imaging system may only take the pixel data 611~617 located within the pixel filtering boundary 500 into consideration, and discard the pixel data 621~625 located outside the pixel filtering boundary 500. In this way, the required computations in the subsequent AWB calibration can be effectively reduced.

For example, the imaging system may select one of the multiple color temperature reference points 210~260 as a target color temperature reference point for use in the AWB calibration by adopting a majority voting approach based on the pixel data 611~617 located within the pixel filtering boundary 500.

In other words, the pixel data 611~617 located within the pixel filtering boundary 500 will be taken into consideration in the AWB calibration, but the pixel data 621~625 located outside the pixel filtering boundary 500 will not be taken into consideration in the AWB calibration.

In practice, the imaging system may modify the aforementioned predetermined saturation difference Sd when identifying different hexagonal filtering boundaries, so as to lower the sensitivity requirement for the image sensor (not shown), to increase the accuracy of the AWB calibration, and to increase the correctness in selecting the target color temperature reference point.

It can be appreciated from the foregoing descriptions that the imaging system is enabled to utilize the pixel filtering boundary 500 to directly filter pixel data in the G/B-G/R color space, without the need to convert the pixel data to other color space for filtering and then convert back to the G/B-G/R color space. Accordingly, the disclosed method not only prevents image distortion caused by the pixel data conversion operation, but also reduces the required computations of the AWB calibration.

Additionally, since the imaging system is enabled to filter pixel data and conduct the AWB calibration in the G/B-G/R color space to directly generate the R gain and B gain, the efficiency of the AWB calibration and the accuracy of the resulting image color can be both effective improved.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The tem "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise. Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An auto white balance calibration method, comprising:
   dividing a G/B-G/R color space into six color regions (301~306) having different color component relationships with referring a specific color temperature reference point (210) as a center;
   respectively identifying six color boundaries (311~316) in the six color regions (301~306) by adopting a saturation calculating approach of a HSV color space to generate a specific hexagonal filtering boundary (310) corresponding to the specific color temperature reference point (210), so that each of the six color boundaries (311~316) has a predetermined saturation difference (Sd) with the specific color temperature reference point (210);
   respectively identifying multiple hexagonal filtering boundaries (320~360) corresponding to other color temperature reference points (220~260) by adopting same approach utilized for generating the specific hexagonal filtering boundary (310);
   generating an enveloping boundary in the G/B-G/R color space based on the specific hexagonal filtering boundary (310) and the multiple hexagonal filtering boundaries (320~360);
   configuring the enveloping boundary as a pixel filtering boundary (500);
   receiving an image;
   filtering out pixel data (621~625) located outside the pixel filtering boundary (500) from the image;
   selecting a target color temperature reference point based on pixel data (611~617) which are located within the pixel filtering boundary (500) of the image; and
   performing an auto white balance calibration on the image based on the target color temperature reference point.

2. The method of claim 1, wherein the six color boundaries (311~316) comprise a first color boundary (311), a second color boundary (312), a third color boundary (313), a fourth color boundary (314), a fifth color boundary (315), and a sixth color boundary (316), and the first color boundary (311), the second color boundary (312), the third color boundary (313), the fourth color boundary (314), the fifth color boundary (315), and the sixth color boundary (316) are connected in order to form the specific hexagonal filtering boundary (310);
   wherein the first color boundary (311) is parallel with the fourth color boundary (314), the third color boundary (313) is parallel with the sixth color boundary (316), while the first color boundary (311) is perpendicular to the sixth color boundary (316).

3. The method of claim 2, wherein the first color boundary (311) and the fourth color boundary (314) are perpendicular to a G/B axis of the G/B-G/R color space, while the third color boundary (313) and the sixth color boundary (316) are perpendicular to a G/R axis of the G/B-G/R color space.

4. The method of claim 1, further comprising:
   modifying the predetermined saturation difference (Sd) when identifying different hexagonal filtering boundaries.

* * * * *